UNITED STATES PATENT OFFICE.

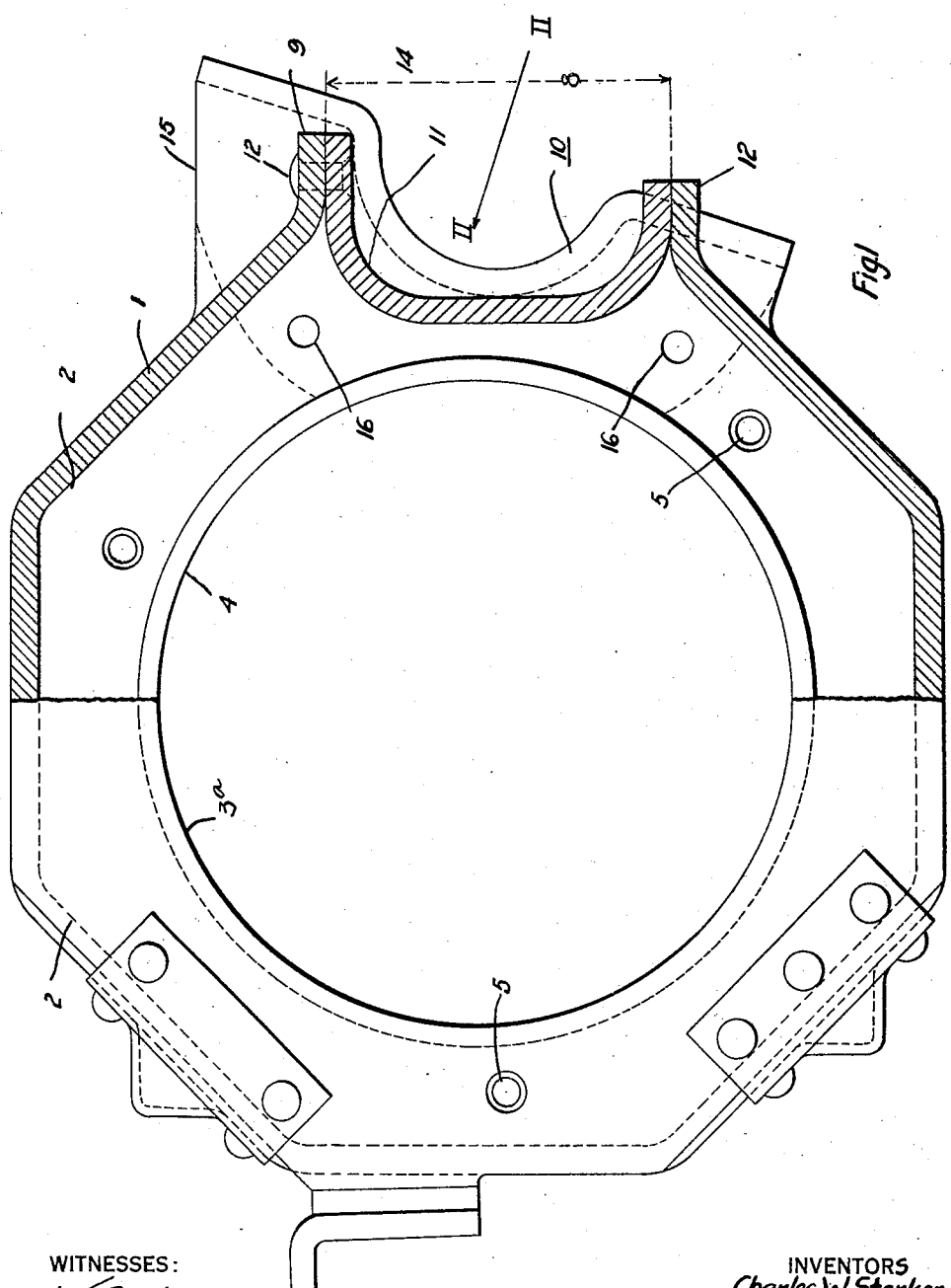

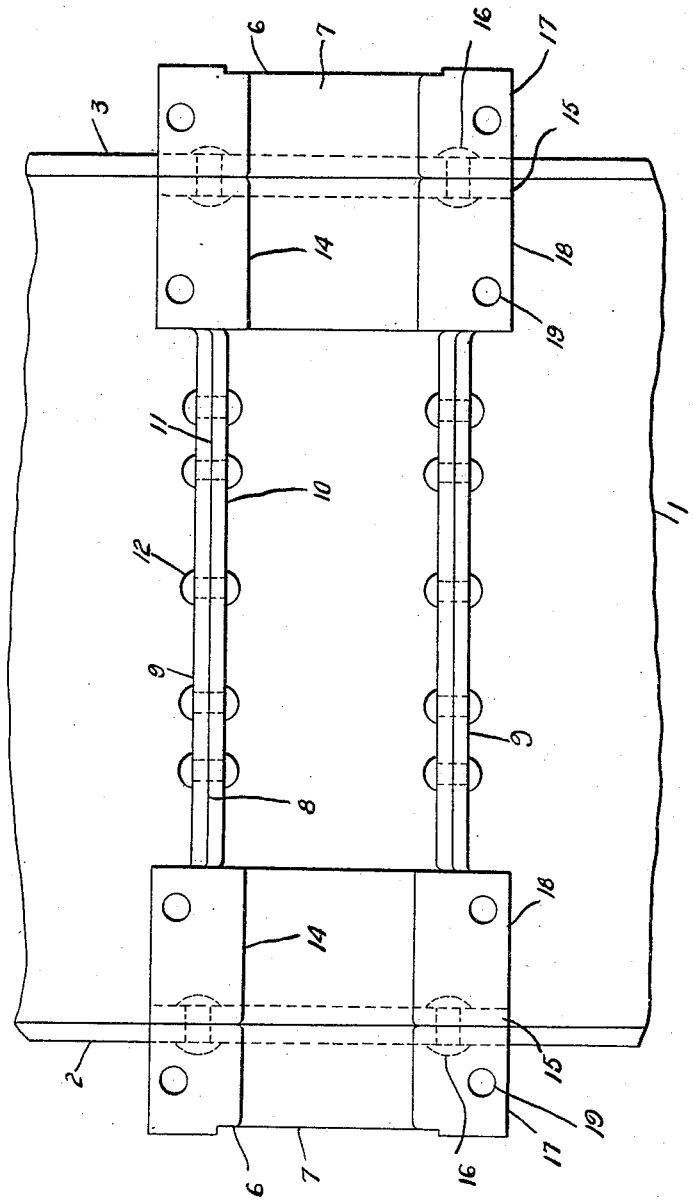

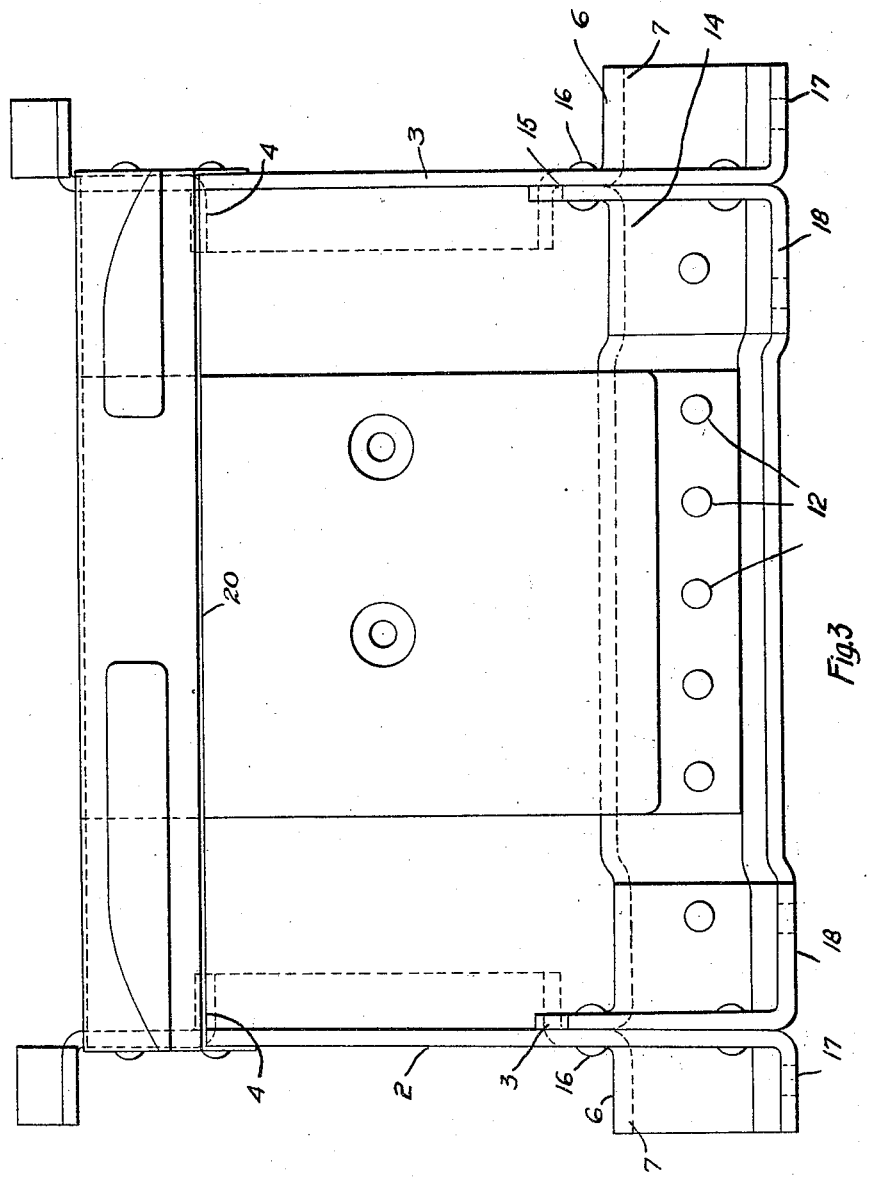

CHARLES W. STARKER, OF PITTSBURGH, PENNSYLVANIA, AND ALEXIS R. PRIBIL, OF CLEVELAND, OHIO, ASSIGNORS TO WESTINGHOUSE ELECTRIC & MANUFACTURING COMPANY, A CORPORATION OF PENNSYLVANIA.

FRAME FOR DYNAMO-ELECTRIC MACHINES.

1,306,564.      Specification of Letters Patent.      Patented June 10, 1919.

Application filed July 19, 1917. Serial No. 181,542.

*To all whom it may concern:*

Be it known that we, CHARLES W. STARKER, a subject of the Emperor of Germany, and a resident of Pittsburgh, in the county of Allegheny and State of Pennsylvania, and ALEXIS R. PRIBIL, a citizen of the United States, and a resident of Cleveland, in the county of Cuyahoga and State of Ohio, have invented a new and useful Improvement in Frames for Dynamo-Electric Machines, of which the following is a specification.

Our invention relates to frames for dynamo-electric machines and particularly to frames that are built up of pressed metal members.

In a copending patent application of Charles W. Starker and Rudolf E. Hellmund, Serial No. 127,359, filed Oct. 24, 1916, and assigned to the Westinghouse Electric & Manufacturing Company, is shown and described a frame for dynamo-electric machines wherein the end rings that are customarily employed for supporting armature bearing housings are fashioned in such manner that they are adapted to form axle-bearing seats in order that the strains arising between the armature and the truck axles may be transmitted through integrally related members. The above-described end rings are made in two parts and they are tied together by a connecting member secured to the main yoke member of the machine.

By our invention, we propose to simplify the construction of the end members and to more evenly distribute the strains occurring therein by providing an armature bearing seat integral therewith and by fashioning the above-described connecting member in such manner that it is adapted to form axle bearing seats that are in complementary relation to those provided on the end rings.

In the accompanying drawings, Figure 1 is a view, partially in section and partially in end elevation, of a dynamo-electric machine frame constructed in accordance with our invention; Fig. 2 is a fragmentary plan view looking in the direction of the line II—II of Fig. 1, and Fig. 3 is a view in side elevation of the structure that is illustrated in Fig. 1.

The frame of the dynamo-electric machine comprises a main magnetizable yoke or band member 1 preferably of the customary polygonal shape and a pair of end rings 2 and 3 which are suitably spaced apart from the yoke member 1. Each end ring comprises a plate of substantially the same form as the outline of a cross-section through the frame 1 and is provided with a central opening 3ª, the edges of which are bent inwardly to form a flange 4 and bolt holes 5 for the reception and support of an armature bearing housing (not shown). The housing may be of any suitable type and is secured within the opening 3ª and the flange 4 through the agency of bolts that are received in the openings 5. A portion 6 of each end ring is bent or flared to extend longitudinally outwardly in an opposite direction from the flange 4 and is pressed into a substantially semi-cylindrical seat 7, for the purpose of supporting a suitable axle bearing member (not shown).

The main yoke member 1 is provided with a gap or opening 8 in one side that is provided with preferably outwardly extending lips 9. A connecting member 10 is provided with a central U-shaped portion 11 that is located within the opening 8 with its longitudinal sides secured to the lips 9 by rivets 12. The respective end portions of the connecting member 10 are formed with approximately semi-cylindrical seats 14 of the same radius as the seats 6. The member 10 is further provided with flanges 15 which are secured to the end rings 2 and 3 by rivets 16 and serve to maintain the respective pairs of axle bearing seats 7 and 14 in alinement. The respective seat portions 7 and 14 are provided with flat transversely extending side members 17 and 18 which are in alinement and are provided with suitable bolt holes 19 for the purpose of securing suitable axle caps (not shown). The end rings 2 and 3 are further connected together by tie members 20 that are constructed substantially as described in the above-mentioned copending patent application.

An advantage of the above-described construction over that described in the previously mentioned copending application lies in the fact that the end rings are partially relieved of the heavy strains arising between the armature and truck axles by the connecting member which is rigidly secured to the main yoke member.

While we have shown our invention in its preferred form, it is not so limited but is susceptible of various minor changes and modifications within the scope of the appended claims.

We claim as our invention:

1. A frame for dynamo-electric machines embodying a main yoke member, an end-ring having a portion shaped to form an axle-bearing seat and a connecting member secured to said end-ring and to the yoke, respectively, and having a portion shaped to form a seat in complemental relation to the first-named seat.

2. A frame for dynamo-electric machines embodying a main yoke member, a pair of end-rings having portions shaped to form alined axle-bearing seats and a connecting member secured to said end-rings and to the yoke and having its end portions shaped to form seats, respectively, in complemental relation to the said seats on the end rings.

3. A frame for dynamo-electric machines embodying a main yoke member and an end-ring and a connecting member, respectively having a portion shaped to form an axle-bearing seat, the said connecting member being secured to said end-ring and to the yoke to maintain said seats in alinement.

4. A frame for dynamo-electric machines embodying a main yoke member, a pair of end rings respectively having a portion shaped to form an axle-bearing seat and a connecting member having flanges and portions shaped to form axle-bearing seats adjacent thereto, the said flanges being secured to said end-rings to maintain the said seats in alinement.

5. A frame for dynamo-electric machines embodying a main yoke member, a pair of end-rings respectively having a portion shaped to form an axle bearing seat and a connecting member having portions shaped to form alined axle-bearing seats, the said connecting member being secured at its ends to the end rings and at a point intermediate the seats to the yoke member to maintain all of said seats in alinement.

6. A frame for a dynamo-electric machine embodying an end ring having an external projection shaped to form an axle-bearing seat and a centrally located flanged opening shaped to form an armature shaft bearing seat, the said bearing seats extending in opposite directions.

7. A frame for a dynamo-electric machine embodying an end-ring having an external portion shaped to form an axle-bearing seat and a centrally located flange shaped to form an armature shaft bearing seat, the said seats extending in opposite directions.

In testimony whereof we have hereunto subscribed our names this 30th day of June, 1917.

CHARLES W. STARKER.
ALEXIS R. PRIBIL.

Copies of this patent may be obtained for five cents each, by addressing the "Commissioner of Patents Washington, D. C."